Feb. 3, 1948.   G. ARSNEAU   2,435,192
TWO-WHEELED TYPE LOG-AND TREE-CUTTING POWER SAW
Filed May 15, 1946   3 Sheets-Sheet 3
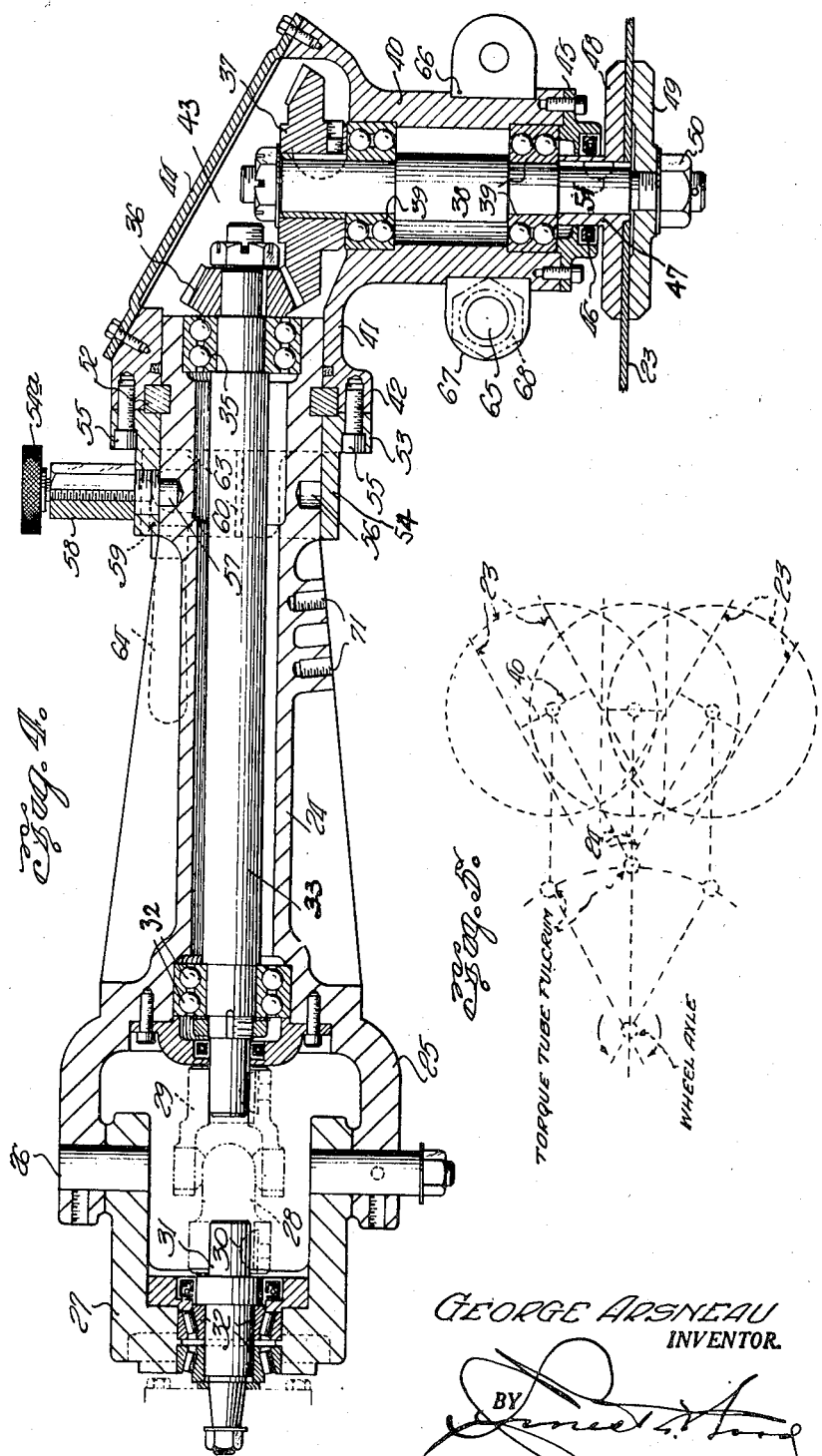
GEORGE ARSNEAU
INVENTOR.
BY
ATTORNEY Patented Feb. 3, 1948

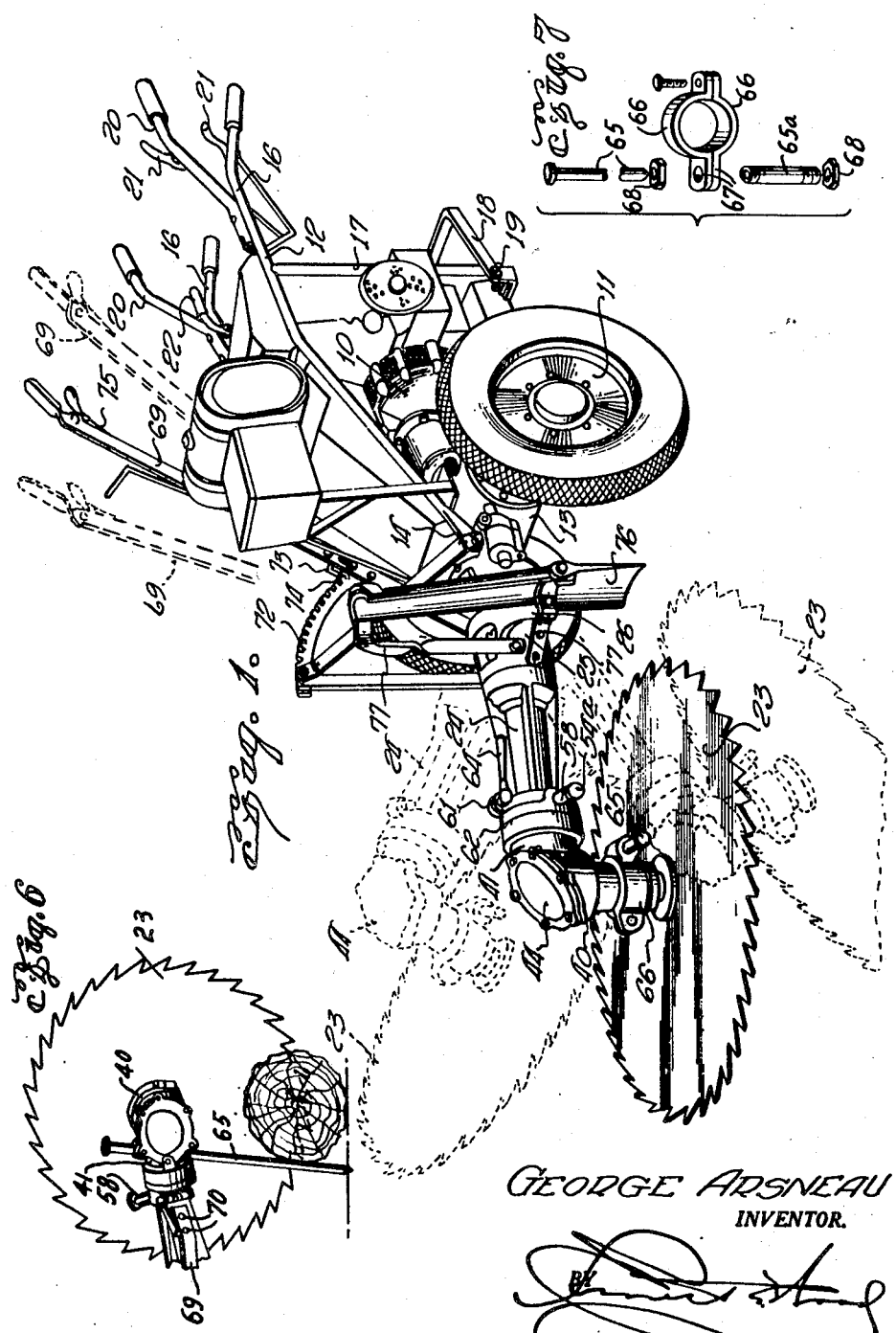

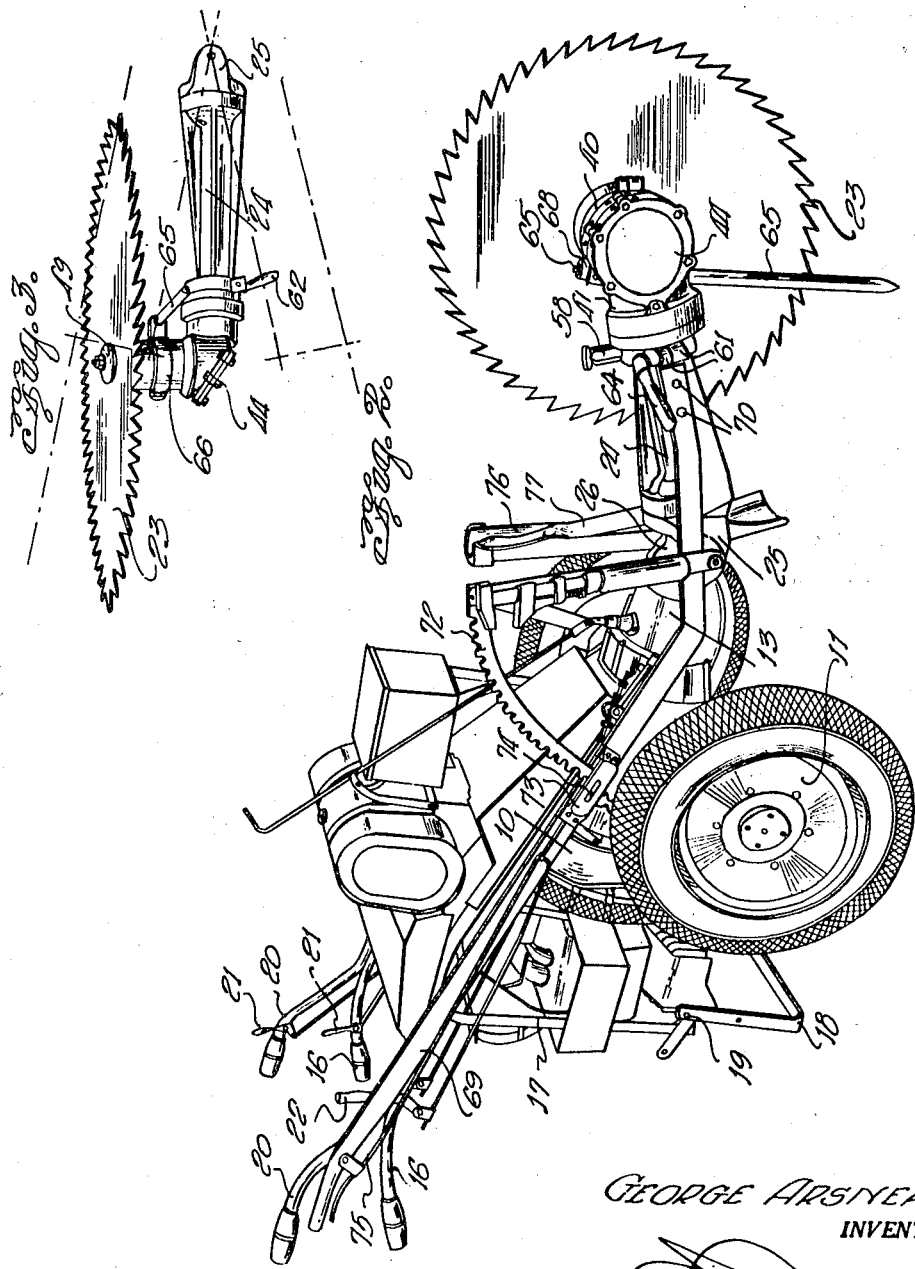

2,435,192

UNITED STATES PATENT OFFICE 2,435,192

TWO-WHEELED TYPE LOG- AND TREE-CUTTING POWER SAW

George Arsneau, Dallas, Tex.

Application May 15, 1946, Serial No. 669,798

6 Claims. (Cl. 143—43)

This invention relates to power saws and more particularly to self propelled, self contained power saws for felling and sawing trees.

The principal object of the invention is to provide certain new and highly adaptable improvements in power saws of the circular type, among which are the comparative ease by which a single operator is enabled to guide the apparatus through dense underbrush to cut the same and by virtue of convenient handle controls, it is possible to govern the speed of the power plant and its transmission in accordance with conditions encountered by the saw, such as felling and sectionizing trees.

Another object of the invention is to provide a frame whose wheels are so disposed in relation to the center of gravity as to insure accurate balance in the entire assembly, which characteristic of the machine is effective to materially reduce the manual effort required to manipulate the same in relation to work.

Another object of the invention is to provide dual or auxiliary sets of handles and attendant controls, one above the other, by which an operator may raise and lower the saw to the maximum without changing from a position in which he may perform his work most efficiently.

Still another object of the invention is to provide a circular saw and mounting disposed forwardly of the power plant and a power transmission to which the saw is connected and driven through a universal, effective to enable the saw to be oscillated vertically through a range of approximately 45° and rotated 360° about its driving axis, which contributes to the flexibiity of the apparatus in performing the work of felling and sectionizing timber. The fact that the fulcrum of the saw carrying and driving assembly is located forwardly of the power plant, enables the saw to be oriented in relation to the work as to height with little change in the position of the power plant.

With the foregoing objects in view, other and lesser objects, together with novel features of accomplishment will become apparent as the description proceeds, taken in connection with the accompanying drawings, wherein:

Figure 1 is a perspective view of a power saw constructed according to the invention.

Figure 2 is a similar view of the opposite side thereof, but showing the saw per se disposed in a vertical plane.

Figure 3 is a detail view of the saw inverted from the position shown in Figure 1, showing the drive assembly housing.

Figure 4 is a vertical sectional view of the drive assembly housing showing the universal and drive gear assembly therein, and Figure 5 is an elevational view in dotted lines showing schematically the flexibility of the saw carrying element.

Figure 6 is a fragmentary side elevational view of the saw assembly, showing the relationship of the work holding stake with the work in making a vertical cut, and Figure 7 is an exploded view of the stake, retaining clamp and associated parts.

In the drawings, reference is primarily made to Figures 1, 2, and 3 wherein numeral 10 denotes generally the power plant, consisting in the present case of an internal combustion engine, supported on wheels 11. It is obvious that any conventional engine of suitable design and horse power may be employed.

The present invention is a variation of and an improvement on applicant's powered chain saw described in his U. S. Letters Patent No. 2,348,588, the chief differences residing in the mounting, to be described presently, especially designed to accommodate a circular saw; the particular manner in which this saw is brought into a position to engage the work at any elevation or angle within predetermined limits and the dual handles and controls for conveniently operating the power plant at different elevations of the saw per se.

Disposed on each side of the engine 10 is a bar, rod or tube 12, rigidly attached to the motor transmission housing 13 at 14 and extending rearwardly to provide a handle 16. A brace rod 17 is joined to each of the handles 16 and extends downwardly and under the rear of the engine 10. A foldable support 18 is pivoted at 19 to the rod 17, to be lowered from the position shown in Figure 1 to that shown in Figure 2 to support the machine when not in use.

Auxiliary to the handles 16 are handles 20, bolted or otherwise affixed to the rods or tubular elements 12 and bent upwardly and rearwardly to lie parallel with handles 16. It is obvious that when the handles 16 are moved downwardly to raise the forward end of the machine, with the wheel axis as the fulcrum, the operator may change his grip on the handles 16 to the handles 20, thus maintaining his position to most effectively operate the machine. In order that this may be accomplished, yet maintaining control of the engine at all times, a throttle lever 21 is mounted on each of the handles 16 and 20 at the left of the operator, while a speed change lever 22 is mounted on the handle 16 to the right of the operator.

Referring now to the driving assembly for the circular saw 23, a torque tube 24 is provided, the rear end of which is bifurcated at 25 to receive fulcrum pins 26 extending outwardly from a housing 27 which contains a universal joint consisting of complementary elements 28 and 29 (see Fig. 4). Element 28 is keyed at 30 to the end of the stub shaft 31, which in turn is connected to the drive shaft, not shown, of the engine. This stub shaft is journaled in bearings 32 as is the end of shaft 33 which carries the companion element 29 of the universal joint and extends through the torque tube 24. The forward end of shaft 32 is journaled in a bearing 35, set in a recess in the forward end of the torque tube.

Mounted on the end of the shaft 33 is a pinion 36 whose teeth engage those of a beveled gear 37, mounted on a shaft 38 journaled in bearings 39 in a housing 40, whose axis is at right angles to that of the torque tube 24, by virtue of a right angular extension 41 having a flange 42 and which receives the forward end of the torque tube. A housing 43 in which the gears 36 and 37 operate has a cover plate 44 bolted thereon.

Secured to the outer end of housing 40 is a plate 45 recessed to receive an oil seal 46 which surrounds a bushing 47 mounted on a reduced portion of the driven saw shaft 38. Integral with this bushing is a plate 48 against which bears one face of the saw 23 while a locking plate 49 bears against the opposite face thereof and is held in fixed position by a nut 50, threaded onto the end of shaft 38. A key 51 holds the bushing 47 against rotation on the shaft.

In order that the saw 23 may be moved from the horizontal operative position shown in Figures 1, 3, and 4 to the vertical operative position shown in Figure 2, or to any intermediate position, the extension collar 41 is capable of rotation on the end of the torque tube 24 but is held against other than rotative movement by a retaining or lock ring 52, mounted in an annular groove made in the torque tube adjacent its end. The end of the collar 14 is recessed to receive a portion of this ring and abutting this recessed portion of the collar 41 is a flange 53, formed on a sleeve 54, mounted on the torque tube 24. Bolts 55 are pressed through apertures in the flange 53 of sleeve 54 into threaded holes in the flange 42 of the collar 41.

The collar 54 is capable of rotation on the torque tube 24 but to hold the saw 23 in adjusted positions, the machined bearing surface of the tube on which the sleeve 54 is mounted, is provided with bores 56, a selected one of which is adapted to receive a pin 57 which passes through a boss 58 and has a threaded portion 59 which is received by a threaded opening in the sleeve 54. A knurled head 54a is provided on the pin. This is the positive locking means for the sleeve 54 and consequently for the saw 23, holding the latter in vertical and horizontal positions. However, a temporary clamp is provided which consists in slotting the sleeve 54 at 60 (Fig. 4) and forming ears 61 on the sleeve on each side of the slot (see Fig. 2). A pin 62 is passed through apertures in the ears and a cam 63, formed on a lever 64, is caused, by operation of a lever, to bear against and clamp the ears together to hold the split sleeve frictionally on the torque tube. By rotating the lever 64 in an opposite direction, tension imposed by the cam is relieved to permit the sleeve 54 to be freely rotated on the tube 24.

It will be observed in Figures 2, 6 and 7 that a stake or rod 65 is provided on the saw axis or collar 40. This rod is freely mounted for longitudinal sliding displacement in a bushing 65a (Fig. 7), which bushing is secured in the parallel ears 67 of a two piece clamp 66. Nuts 68 are threaded onto the ends of the bushing to secure the same against displacement with respect to the ears 67, yet allowing for free movement of the stake in the bushing, as described.

The purpose of the stake is to bear against the surface of a log confronting the saw carriage, resisting the tendency of the saw 23 to roll the same towards the operator. When a vertical cut is made, the saw is in the position shown in Figure 2 and as the saw cuts into the work, the lower end of the stake engages the ground. However, since the stake is freely mounted to slide in its bushing 65a, the saw will continue downwardly through the work while the stake remains stationary and does not change its position against the work, holding the same until the saw completes the cut.

Chain saws of the type described in the aforesaid Patent No. 2,348,588 have shown exceptional efficiency in forestry work where the undergrowth is comparatively sparse. To pursue the forestry work beyond the capacity of the chain saw, the circular saw shown and described has been developed with a view towards eliminating undergrowth adjacent to the timber to be cut with little effort on the part of the woodsman operating the saw.

To operate the saw in dense growth, it is necessary only to adjust the saw 24 to its lowest horizontal plane as shown in Figure 1. With the motor operating at reduced speed the operator walks behind the machine as it is propelled through the underbrush by the motor. It is possible to swing the saw from side to side slowly to increase the width of the swath cut thereby.

To fell trees flush with the ground, the saw remains in the position shown in Figure 1 but it is sometimes desirable to make a wedge shaped cleft in the tree prior to sawing to insure that the tree will fall in the desired direction. To accomplish this, the pin 57 is withdrawn and the cam lever 64 operated to dispose the saw 23 at an inclined plane. After the cleft is made, the saw is returned to the horizontal plane and sawing is resumed. Pikes are usually employed to direct the fall of a tree after sawing through its trunk.

In certain cases, it is desirable to elevate the saw to make a horizontal cut at an elevated position on the trunk of a tree so that a high stump will be left. This is accomplished by first inverting the saw from the position shown in Figure 1 to that shown in Figure 3. A hand lever 69 is provided for raising the forward end of the torque tube 24 as permitted by the universal joint 28—29. This lever 69, extends downwardly alongside the machine frame and thence parallel with the torque tube 24, to which it is secured by bolts 70 (Fig. 2) entering threaded holes 71 (Fig. 4) in the torque tube.

A notched, arcuate bar 72 receives a bracket 73 on the lever 69 and, by means of a dog 74 enclosed by the bracket 73 and actuated by a rod 75 parallel with the lever 69, the lever and consequently the torque tube 24 is locked in an elevated position. The saw 23 is moved to and held in a horizontal plane by the operator holding the handles 16 or 20 and the saw is advanced upon the tree in the same manner as if the same were sawed flush with the ground as described.

After a tree has been felled, the saw is adjusted to the vertical position shown in Figure 2 and by actuating the handles 16—20, the saw may be elevated above the work and lowered as it passes through the log by its own weight, supplemented by upward pressure on the handles if added force is necessary to complete or speed up the operation.

In making a cut of the nature last described, it is desirable that the operator and the implement itself be protected from flying sawdust. This sawdust as it is projected from the cut by the teeth of the saw, is intercepted by a trough-like guard 76, secured by brackets 77 to the casting 25 serving as a housing for the universal joint 28—29.

Figure 5 illustrates schematically in dotted lines the wide range of adjustment made possible through the fulcrum, i. e., universal joint located forwardly of the wheel axis of the motor frame. In this illustration, which represents a side elevational view of that part of the machine forwardly of the fulcrum, the torque tube 24 is movable vertically in relation to the motor drive shaft through a range of substantially 15°-20°. However, the added displacement brought about by oscillating the frame through the handles, increases the range of displacement of the saw to approximately 45° which is adequate for optimum results.

It is further pointed out that the provision for rotating the saw per se about the axis of the torque tube 24, combined with the described displacement of the latter, permits a cut to be made horizontally from a point flush with the ground to a point well above the wheel axis. Moreover, through this range, clefts at any desired angle may be made in the trunk of a standing tree. The true horizontal position of the saw is maintained by vertically displacing the fulcrum point of the torque tube as exemplified in Figure 5, which is effected by the operator's manipulation of the handles 16—20 and the lever 69.

In making a vertical cut such as in the trunk or branches of a felled tree, the same approach to the work obtains except that the saw is disposed in a vertical plane or angularly displaced with respect thereto for making angular cuts such as may be necessary in severing oblique branches or for approaching work disposed on a plane inclined to the horizontal.

It is obvious from the foregoing that all controls necessary for operating both the engine and saw are disposed at the rear of the machine, hence a single operator, with little danger to himself and with comparatively little effort, may propel the machine through and cut the densest underbrush or fell and sectionize trees with efficiency unsurpassed by conventional power saws.

Manifestly, the construction as shown and described is capable of some modification and such modification as may be construed to fall within the scope and meaning of the appended claims is also considered to be within the spirit and intent of the invention.

I claim:

1. A power saw, comprising a power unit; a pair of ground wheels supporting said power unit for tilting vertically thereon; a pair of handles secured at opposite sides of the unit and extending rearwardly thereof; a pair of auxiliary handles disposed in vertically spaced parallel relation with respect to the first pair; means carried by each pair of handles for controlling the said power unit; a torque tube vertically pivotally mounted on the power unit forwardly of the said wheels; a shaft journaled in said tube and driven by the power unit through a universal joint; a saw driven by the said shaft; and means for maintaining the torque tube in adjusted vertically pivoted position.

2. A power saw, comprising a power unit; a pair of ground wheels supporting said power unit for tilting vertically thereon; a pair of handles secured at opposite sides of the power unit and extending rearwardly thereof; a pair of auxiliary handles disposed in vertically spaced parallel relation with respect to the first pair; means carried by each pair of handles for controlling the said power unit; a torque tube vertically pivotally mounted on the power unit forwardly of the said wheels; a shaft journaled in said tube and driven by the power unit through a universal joint; a housing swiveled on the outer end of the torque tube; a second shaft journaled in the housing intermeshing gearing carried by the first and second shafts respectively; a circular saw carried by the said second shaft beyond said housing; means for locking the housing in adjusted position on the torque tube; and means for locking the torque tube in adjusted vertically pivoted position.

3. In combination with a power saw as set forth in claim 2, a split clamp around the housing opposite the second shaft; and a stake slidably carried by the clamp; said stake being disposed substantially vertically to hold the work from rolling during operation of the saw when operating in a substantially vertical plane.

4. A self-propelled power saw comprising a power unit; a pair of ground wheels supporting said power unit in approximately balanced position while permitting same to be tilted vertically thereon; a foldable support for supporting the assembly in normal position; a pair of handles secured at opposite sides of the power unit and extending rearwardly thereof; a pair of auxiliary handles disposed in vertically spaced parallel relation with respect to the first pair; means carried by each pair of handles for controlling the said power unit; a torque tube vertically pivotally mounted on the power unit forwardly of the said wheels; a shaft journaled in said tube and driven by the power unit through a universal joint; a housing swiveled on the outer end of the torque tube; a second shaft journaled in the housing normal to the axis of the first shaft; intermeshing beveled gearing carried by the first and second shafts respectively; a circular saw carried by the said second shaft beyond said housing; means for locking the housing in adjusted position on the torque tube; and means for locking the torque tube in adjusted vertically pivoted position.

5. In combination with a power saw as set forth in claim 4, a split clamp around the housing opposite the second shaft; and a stake slidably carried by the clamp; said stake being disposed substantially vertically to hold the work against rolling during operation of the saw when operating in substantially vertical position.

6. In a power saw, a torque tube, a shaft journaled in said tube; a housing swiveled on said tube, a second shaft journaled in the housing normal to the axis of the first shaft; beveled gearing between said shafts; a circular saw carried by the second shaft; a split clamp around the housing opposite the second shaft; and a stake slidably carried by the clamp; said stake being disposed substantially vertically to hold the work from rolling during operation of the saw when the latter is disposed substantially vertically.

GEORGE ARSNEAU.

REFERENCES CITED

The following references are of record in the file of this patent:

UNITED STATES PATENTS

| Number | Name | Date |
|---|---|---|
| 2,348,588 | Arsneau | May 9, 1944 |
| 1,601,859 | Johnson | Oct. 5, 1926 |
| 1,858,015 | Hodgson | May 10, 1932 |
| 1,955,997 | Yant | Apr. 24, 1934 |
| 2,201,224 | Buchen | May 21, 1940 |
| 324,874 | Morton | Aug. 25, 1885 |

FOREIGN PATENTS

| Number | Country | Date |
|---|---|---|
| 84,732 | Switzerland | Apr. 16, 1920 |
| 620,956 | France | Jan. 25, 1927 |
| 117,455 | Australia | Aug. 31, 1943 |
| 118,817 | Australia | Aug. 14, 1944 |